US011192409B2

(12) United States Patent
Brummel (10) Patent No.: US 11,192,409 B2
(45) Date of Patent: Dec. 7, 2021

(54) TRAILER COUPLING HAVING A CONNECTION DEVICE

(71) Applicant: WESTFALIA-AUTOMOTIVE GMBH, Rheda-Wiedenbrück (DE)

(72) Inventor: Christian Brummel, Gütersloh (DE)

(73) Assignee: WESTFALIA-AUTOMOTIVE GMBH

( * ) Notice: Subject to any disclaimer, the term of this patent is extended or adjusted under 35 U.S.C. 154(b) by 316 days.

(21) Appl. No.: 16/330,112

(22) PCT Filed: Oct. 4, 2017

(86) PCT No.: PCT/EP2017/075225
§ 371 (c)(1),
(2) Date: Mar. 4, 2019

(87) PCT Pub. No.: WO2018/065469
PCT Pub. Date: Apr. 12, 2018

(65) Prior Publication Data
US 2019/0232741 A1    Aug. 1, 2019

(30) Foreign Application Priority Data

Oct. 7, 2016    (DE) ...................... 10 2016 119 153.1
Oct. 12, 2016    (DE) ...................... 10 2016 119 393.3

(51) Int. Cl.
*B60D 1/54* (2006.01)
*B60D 1/06* (2006.01)
(Continued)

(52) U.S. Cl.
CPC ................. *B60D 1/54* (2013.01); *B60D 1/06* (2013.01); *B60D 1/58* (2013.01); *B60D 1/62* (2013.01);
(Continued)

(58) Field of Classification Search
CPC ...... B60D 2001/544; B60D 1/54; B60D 1/58; B60D 1/64; B60D 1/62; B60D 1/246;
(Continued)

(56) References Cited

U.S. PATENT DOCUMENTS 6,860,503 B2 * 3/2005 Aufderheide ............ B60D 1/54
280/491.1
7,273,222 B2 * 9/2007 Rampp .................... B60D 1/54
280/491.3
(Continued)

FOREIGN PATENT DOCUMENTS

DE       10243045      3/2004
DE       10347817      5/2005
(Continued)

OTHER PUBLICATIONS

International Search Report and Written Opinion dated Jan. 5, 2018 in International Patent Application No. PCT/EP2017/075225 filing date Oct. 4, 2017. ISA/EP.

*Primary Examiner* — Minnah L Seoh
*Assistant Examiner* — Hosam Shabara
(74) *Attorney, Agent, or Firm* — McDonald Hopkins LLC (57) ABSTRACT

The invention relates to a trailer coupling having a support arrangement adapted to be fastened, to a vehicle, on which a bearing is mounted, wherein on the bearing a coupling element is moveable between a use position which is suitable for coupling a trailer to the coupling element, and in which when the trailer coupling is mounted on the motor vehicle the coupling element projects rearwardly of the motor vehicle, and a non-use position in which the coupling element is back behind a bumper of the motor vehicle. On the coupling element, a connecting device for connecting an on-board network of the trailer to an on-board network of the motor vehicle is provided. The connecting device is connectable, to the on-board network of the motor vehicle by a
(Continued)

cable comprising a flexible cable section, which at a first longitudinal end is attached to the coupling element in a fixed manner with respect to the carrier arrangement, and at a second longitudinal end is attached to the coupling element in a fixed manner, and which follows the movement of the coupling element between the use and non-use positions. The trailer coupling comprises a winding device for winding a winding section of the cable section onto a cable reel when the coupling element is moved between the use position and the non-use position.

29 Claims, 3 Drawing Sheets (51) Int. Cl.
B60D 1/62 (2006.01)
B60D 1/58 (2006.01)
B65H 75/42 (2006.01)

(52) U.S. Cl.
CPC ..... *B65H 75/425* (2013.01); *B60D 2001/544* (2013.01)

(58) Field of Classification Search
CPC . B60D 1/06; B60D 1/065; B60D 1/56; B65H 75/425; F16C 1/20

USPC ...................................... 280/491.3, 422, 511
See application file for complete search history.

(56) References Cited

U.S. PATENT DOCUMENTS

| | | | | |
|---|---|---|---|---|
| 7,699,335 | B2* | 4/2010 | Riehle | B60D 1/246 |
| | | | | 280/491.1 |
| 9,744,821 | B2* | 8/2017 | Mutlu | B60D 1/52 |
| 2007/0007749 | A1* | 1/2007 | Gentner | B60D 1/26 |
| | | | | 280/491.1 |
| 2015/0352915 | A1* | 12/2015 | Burkhardt | B60D 1/065 |
| | | | | 280/491.3 |
| 2016/0159177 | A1* | 6/2016 | Rimmelspacher | B60D 1/06 |
| | | | | 280/491.3 |
| 2016/0176251 | A1* | 6/2016 | Mutlu | B60D 1/54 |
| | | | | 280/491.3 |
| 2019/0225039 | A1* | 7/2019 | Angermann | B60D 1/54 |
| 2019/0270354 | A1* | 9/2019 | Angermann | B60D 1/485 |

FOREIGN PATENT DOCUMENTS

| | | |
|---|---|---|
| DE | 202005006751 | 7/2005 |
| DE | 29825216 U1 | 4/2006 |
| DE | 102011014882 | 9/2012 |
| DE | 102012005791 A1 | 9/2012 |
| EP | 3034335 A1 | 6/2016 |

* cited by examiner

TRAILER COUPLING HAVING A CONNECTION DEVICE

CROSS-REFERENCE TO RELATED APPLICATION

This application is a 35 U.S.C. § 371 national stage application of PCT Application No. PCT/EP2017/075225 filed on Oct. 4, 2017, entitled "TRAILER COUPLING HAVING A CONNECTION DEVICE," which claims priority to German Patent Application No. 10 2016 119 153.1 filed on Oct. 7, 2016, and German Patent Application No. 10 2016 119 393.3 filed on Oct. 12, 2016, each of which are incorporated herein in their entirety by reference.

The invention relates to a trailer coupling having a support arrangement that is fastened, or can be fastened, to a motor vehicle, on which a bearing is mounted, wherein on the bearing a coupling element, in particular a coupling arm, can be moved by means of an adjustment movement between a use position which is suitable for coupling a trailer or load carrier to the coupling element, and in which when the trailer coupling is mounted on the motor vehicle the coupling element projects rearwardly of the motor vehicle, and a non-use position in which the coupling element is advantageously moved back behind a bumper of the motor vehicle wherein on the coupling element, a connecting device for connecting an on-board network of the trailer or load carrier to an on-board network of the motor vehicle is provided, wherein the connecting device is connected, or connectable, to the on-board network of the motor vehicle by means of a cable comprising a flexible cable section, which at a first longitudinal end is attached to the coupling element in a positionally fixed manner with respect to the carrier arrangement, and at a second longitudinal end is attached to the coupling element in a positionally fixed manner, and which follows the movement of the coupling element between the use position and the non-use position.

By way of example, such a trailer coupling is identifiable in EP 2 871 081 A2. On the coupling element in the form of a coupling arm of the trailer coupling, a holder is provided for a trailer socket, and thus a connection device. The trailer socket is connected to the on-board network of the motor vehicle by a flexible cable that is not shown in the drawings.

With the routing of the flexible cable the problem often arises that during the pivoting movement of the coupling arm between the use position and the non-use position this cable is often deformed in an unintended manner, by way of example becomes jammed or damaged in another way.

Therefore, the object of the present invention is to provide a trailer coupling with an improved routing of a cable for a connection device mounted on a coupling element.

To achieve this object, on a trailer coupling of the abovementioned type, it is provided that the trailer coupling comprises a winding device for winding up a winding section of the cable section onto a coil when the coupling element is moved between the use position and the non-use position.

The basic idea behind this is that the cable section can be specifically wound up and unwound between, by way of example, the support arrangement or an outlet on the motor vehicle and the connection device on the coupling arm. It can be provided that the first longitudinal end is attached in a positionally fixed manner, by way of example, to a cross-member or another component of the support arrangement. It is also possible for the first longitudinal end of the flexible cable section to be attached to bodywork or another component of the motor vehicle, by way of example on a passageway or outlet, allowing routing of the cable between an interior of the motor vehicle and the exterior, where the trailer coupling is arranged.

By way of example, the cable can comprise one or more electrical and one or more optical cables. The connection device is preferably designed as a connection socket or trailer socket. It is advantageous if the connection device comprises at least one electrical plug contact or at least one optical contact, in particular plug contact.

The cable section can run freely in space across one region, but at another region, namely in the region of the winding section, is routed carefully enough to avoid damage. The winding section wound onto the coil is not free in space, but wound onto the coil arranged with a positional definition. The coil itself is preferably wound onto a winding body, but can be a free-standing, i.e., without support on the winding body.

It is basically possible for the winding device to wind up the cable when the coupling arm is moved from the use position to the non-use position and to unwind it in the opposite direction. But it is also possible for the winding device to wind up the coil when the coupling arm is moved from the non-use position to the use position and vice versa, thus from the use position to the non-use position. Thus, the winding device shortens the length of the flexible cable section as a function of which of the two positions, the use position and the non-use position, has a shorter distance between the coupling arm or the point of fixing of the cable section on the coupling arm and the point of fixing, which is positionally fixed with regard to the support arrangement.

An advantageous concept provides that the winding device is mounted on the coupling element. Consequently, by way of example, the coupling element specifies the winding movement for winding up or unwinding the coil. But it is also possible for the winding device to be rotatable relative to the coupling element, in order to wind up or unwind the coil.

A preferred concept is also if the winding device has a fixed connection or is moveably-coupled to the coupling element, so that during the adjustment movement between the use position and the non-use position, the winding device is driven for winding or unwinding the coil, by way of example is rotationally driven. So, consequently, the coupling element can carry with it the winding device, by way of example the winding body explained in more detail later on, during the movement between the use position and the non-use position.

By way of example, a motion coupling between the winding device and the coupling element can be provided by means of a transmission gear, for example a toothed gearing, a rope transmission or similar.

It is also possible for a drive for driving the coupling arm to have an output on one side for the coupling element and on the other for the winding device, by way of example a rotary drive.

An expedient concept provides that the winding device comprises a winding body for winding up the cable section, onto which the cable section can at least in part be wound.

It is also possible for the winding section to provide the coil at least in sections with a freestanding configuration without support on a winding body. Thus, by way of example, the coil can be configured like a freestanding helix or partial helix. Combinations of this measure with the abovementioned measure are perfectly possible, e.g. by way of example, one subsection of the winding section can be wound onto the winding body, and another subsection of the winding section provides the coil with a freestanding configuration without support on the winding body.

By way of example, the winding body can comprise or be configured as a drum. By way of example, the drum is cylindrical. However, the winding body can also comprise at least a conical or inclined section. By way of example, such a section can facilitate the adjacent winding of individual windings of the coil.

The winding body can comprise support contours arranged at an angular distance from one another, by way of example support ribs, for supporting the coil. Consequently, the coil does not fit directly against an outer circumference of the winding body, but is supported on individual support ribs or other support contours. In particular, this can facilitate the winding up and/or unwinding of the coil.

Expediently, the coupling element is supported so that it can pivot about at least one pivot axis between the use position and the non-use position. So, in this case, the abovementioned bearing, mounted on the support arrangement, is a pivot bearing. However, multi-axis pivoting movements are also perfectly possible, i.e. the coupling element is supported so that it can pivot about at least two axes between the use position and the non-use position. But it is also expedient if the coupling element is supported by means of a sliding bearing or so that it can displace linearly in relation to the support arrangement. Thus, by way of example, the coupling arm can be supported so that it is linearly displaceable in relation to the positionally fixed point of fixing of the flexible cable section to the motor vehicle or the support arrangement. But combinations are also perfectly possible, e.g. a pivoting and sliding support of the coupling arm in relation to the support arrangement.

Expediently, the winding device, by way of example the winding body, is supported so that it can rotate about at least one pivot axis of the coupling element for winding up and for unwinding of the coil. In particular, if the coupling arm or the other coupling element rotates between the use position and the non-use position, it can be followed on this path by the winding device, by way of example the winding body.

It is also possible for the winding device, by way of example the winding body, to be mounted on a pivot bearing section able to pivot on the support, by way of example a bearing head, of the coupling element. By way of example, the winding body can be mounted on the front face. By way of example, the winding body can be a separate component mounted on the pivot bearing section in particular positionally fixed and/or secured against rotation. But it is also possible for the winding body to be formed by the pivot bearing section or, as it were, a component of the pivot bearing section.

Expediently, the second longitudinal end of the cable section runs in an arc or with a curve with a direction of curvature that corresponds to the curvature of the coil on the coupling element. By way of example, the second cable section is fixed on the coupling element according to this curvature. Consequently, the curvature of the cable section on the coupling element is the same as in a transition zone between the cable and the coupling element. Thus, the curvature is preferably constant.

By way of example, attachment of the cable to the coupling element, to the winding body, to the support arrangement or to the motor vehicle can take place by means of a recess retaining the cable in the clamping seat, a cable clip, a cable tie or similar.

Preferably, securing the cable section on the coupling element already determines the direction of the coil to be created.

An embodiment provides that the second longitudinal end is attached at a point of fixing or sole point of fixing to the coupling element and/or a winding body supporting the coil at least in sections. Consequently, by way of example a rotation of the winding body or of the coupling element can serve for winding up the coil or for unwinding the coil.

It should be noted at this point, that it is perfectly possible for the second longitudinal end or winding section or both to frictionally engage with the winding body or the coupling element, by way of example by means of one or more windings, so that a torque of the coupling element or winding body can be used to unwind the cable section from the coil or to wind it up onto the coil.

The second longitudinal end is preferably positionally fixed to at least two points of fixing or fixing arrangements, which have a longitudinal distance and/or an angular distance from one another, on the coupling element and/or a winding body supporting the coil at least in sections, by way of example the abovementioned drum. By way of example, this measure can contribute to the winding section or cable section already having a curvature corresponding to the coil or being fixed with this curvature on the winding body or coupling element.

An expedient concept provides that the cable between the second longitudinal end of the windable cable section and the connection device is fixed to the coupling element. So, consequently, the cable does not run freely or movably on the coupling element or coupling arm, but is fixed on the coupling element such that damage to the cable section along the coupling element towards the connection device can be avoided. By way of example, the fixing takes place by means of adhesion, by means of cable clips, clamps or similar.

By way of example, it is advantageous if the cable runs closely packed on the coupling element. By way of example, one or more cable clips or other securing means for fastening the cable can be provided.

It is also advantageous if on the coupling element, by way of example on the coupling arm, an accommodating channel is provided, on or in which at least one subsection of the cable runs between the second longitudinal end of the windable cable section and the connection device. By way of example, the accommodating channel can comprise a tube or a groove.

It is preferable if the cable section between the coil and the support arrangement or the coupling element in the use position and the non-use position has substantially the same longitudinal length and/or the same geometrical path and/or a loop shape. Consequently, the path of the cable between the coil and the, as it were, next positionally fixed attachment, namely by way of example the coupling element or the support arrangement, does not change even when the coupling element moves between the use position and the non-use position. However, minor variations are perfectly possible since the cable section is actually flexible. However the, as it were, largest geometrical variation, experienced by the cable section is in the region of the coil, wherein it is simply specifically routed there and thus, by way of example, buckling, jamming or similar is avoidable. The loop shape can, by way of example, comprise one or more curvature sections. However, the loop need not be closed, but may, as it were, have an open, looping path.

It is worth mentioning that the winding device, in particular the winding body, can also be mounted on the support arrangement. By way of example, the winding body can be rotatably supported on a cross-member or other component of the support arrangement.

Expediently, the winding device has at least one shaped body mounted on the cable section and extending along the cable section, which causes the form of the cable section by way of example in a wound up state configuring the coil or in an unwound state unwound from the coil and extending the cable section. By way of example, the shaped body can contribute towards or serve the purpose of forming a free-standing coil. But it is also possible for the shaped body to, as it were, reinforce or stretch the cable or the cable section, so that the cable section after unwinding from the coil adopts an elongated form.

By way of example, the shaped body can comprise or be formed by an individual conductor of the sheath enclosing the cable section. By way of example, a suitably stiff sheath material can be provided which has an inherent tendency to bring the cable section into an elongated form. However, the sheath material can also be pre-formed, in order to predetermine the coil or the curved form of the cable section on the coil.

It is also possible for the shaped body to have a curvature, running transversally to the elongation of the cable section and which changes its radius of curvature upon stretching or winding of the cable section. By way of example, such a shaped body may be what is known as an expansion insert.

Expediently, it is provided that the coil maintains its wound position without the effect of force or with the effect of a force that is lower than one for winding up the coil. Preferably, the coil will automatically tend to, as it were, wind up. By way of example, this can be achieved by means of the abovementioned shaped body. By way of example, the sheath can have an essentially curved form, that forms the coil, so that it is stretched upon unwinding of the coil, but through the unwinding develops a force suitable for winding the coil or a force working in this direction.

An advantageous concept provides that the winding device is driven in the direction of a winding up or in the direction of an unwinding or both of the cable section by a drive. By way of example, the drive can be a motorised drive or a spring drive. By way of example, the spring drive can comprise a spiral spring.

It is preferable if the drive used to drive the coupling element is also used to drive the winding device. However, the drive can also be formed by the coupling element itself, which as it were drives the winding device, when it is pushed between the use position and the non-use position. By way of example, to this end, the abovementioned motion coupling can be provided between the coupling element and winding device.

Expediently, it is provided that the coil in the wound up state forms a half, preferably a three-quarters winding. Expediently, even a complete winding is provided, e.g. a coil with at least one complete winding is formed, when the coil is wound up. However, it is also perfectly possible for further windings to be provided.

Expediently, in the wound up state of the cable section at least two subsections of the cable section having a longitudinal distance from one another intersect. By way of example, this can be the case based on the abovementioned at least one winding. It is also possible that in the wound up state of the cable section these subsections are arranged alongside one another and/or fit tightly against each other.

It is possible that the winding device, by way of example the coil, operates as a brake and/or a drive when the coupling element is moved between the use position and the non-use position.

So, if, by way of example, the coil has a certain dimensional stability, it operates as a drive or a brake or both, when the coil is wound or unwound. If the dimensional stability of the cable section or the winding section is, for example designed for unwinding or stretching the cable section or winding section, the coil tends to unwind. By way of example, if the unwound state of the coil correlates to the use position of the coupling arm, the dimensional stability of the cable section works in the direction of the use position, e.g. in the direction of the use position the coil or the winding device operates as a drive, and in the direction of the non-use position as a brake. By way of example, if the coil or winding section has a dimensional stability, for example by means of the abovementioned shaped body, a spring or similar, in the direction of a winding up of the cable section towards the coil, and the wound up state of the cable section correlates with the non-use position, the coil or the winding device operates as a brake, when it is being wound up, e.g. in the direction of the use position. It can operate as a drive in the direction of the non-use position.

A drive or brake of the winding device can also simultaneously operate as a drive for the coupling arm or the coupling element. So, if, by way of example a spring drives the winding body for winding up the coil, this must be tensioned during unwinding of the coil, and so becomes like a brake. If the winding body is rotationally coupled to the coupling element, it transmits the corresponding braking force or driving force of its drive to the coupling element.

By way of example, the coupling element comprises a coupling arm. Expediently, on the coupling element a coupling piece, in particular a coupling ball, is provided for coupling of the trailer and/or load carrier. By way of example, what is known as a ball-type coupling can be coupled to a coupling ball to form a rotary joint. A load carrier is as a rule connected to the coupling piece. However, plug connectors between the coupling element and, by way of example, the load carrier are also possible, wherein by way of example on the coupling element a socket or a plug-in projection is provided for attaching the load carrier.

In the following, exemplary embodiments of the invention are described by means of the drawing. This shows as follows.

With the trailer couplings 10, 110 shown in the drawing to some extent the same or similarly acting components are provided, so that in this regard the same or similar reference numerals are used. To illustrate differences between the exemplary embodiments 10, 110 generally reference numerals incremented by 100 are used.

The trailer coupling 10 comprises a support arrangement 11 with a cross-member 12 which, by way of example, runs transversally on the rear of a motor vehicle 90. By way of example, the cross-member 12 is attached by a side member to bodywork 91 of the motor vehicle 90. By way of example, the side members (not shown) are screwed to the bodywork 91. The side members can extend laterally in the direction of travel along the motor vehicle 90 on the outside of the bodywork or also be mounted on the back.

So, the support arrangement 12 is connected to the bodywork 91 of the motor vehicle 90.

Figure 1:
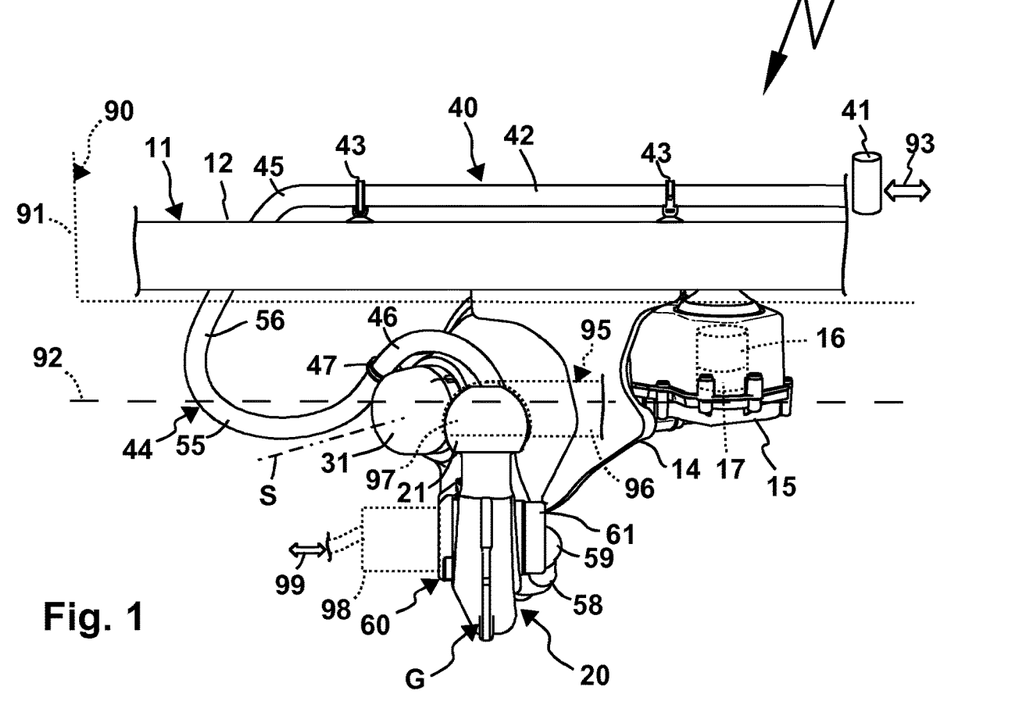
FIG. 1 a front view from behind of a motor vehicle with a trailer coupling, the coupling element of which is in the use position suitable for coupling a trailer.
Figure 2:
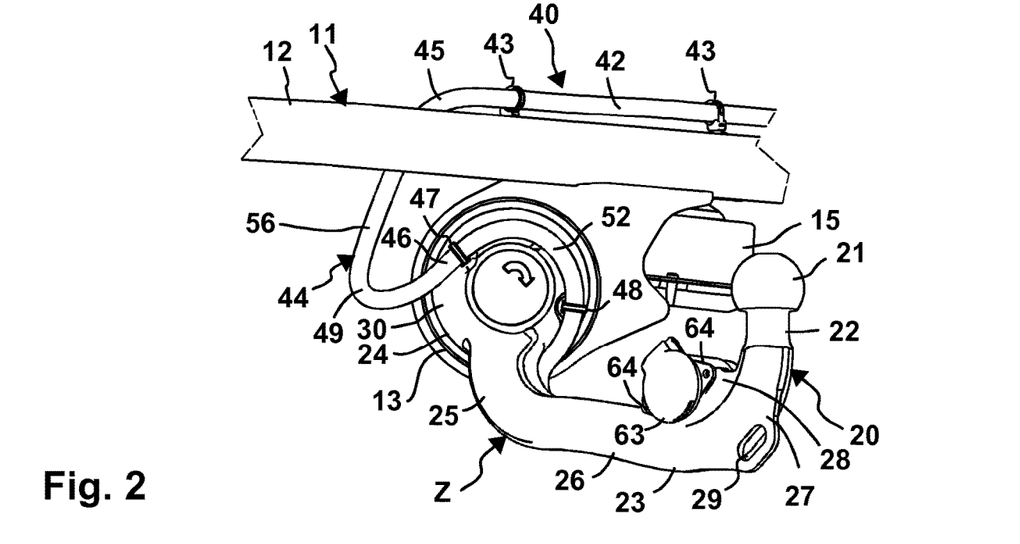
FIG. 2 the trailer coupling according to FIG. 1, wherein, however, the coupling arm is already minimally pivoted in the direction of that shown in FIG. 3 as a non-use position.

The support arrangement 12 is arranged between the bodywork 91 and a bumper 92 of the motor vehicle 90. In the use position G shown in FIG. 1 a coupling element 20 protrudes backwards in front of the rear or the bumper 92 of the motor vehicle 90, to allow a trailer 95 or load carrier 195 to be coupled to the coupling element 20.

By way of example, the trailer 95 comprises a drawbar 96, on the free end of which a ball-type coupling 97 is arranged. The ball-type coupling 97 is rotatably supported on a coupling piece 21 of the coupling element 20, by way of example on a coupling ball.

By way of example, the load carrier 195 can be connected by a coupling 197 in particular a clamp coupling or a plug-in coupling, to the coupling piece 21. By way of example, the coupling 197 is mounted on a frame 196 of the load carrier 195.

Figure 3:
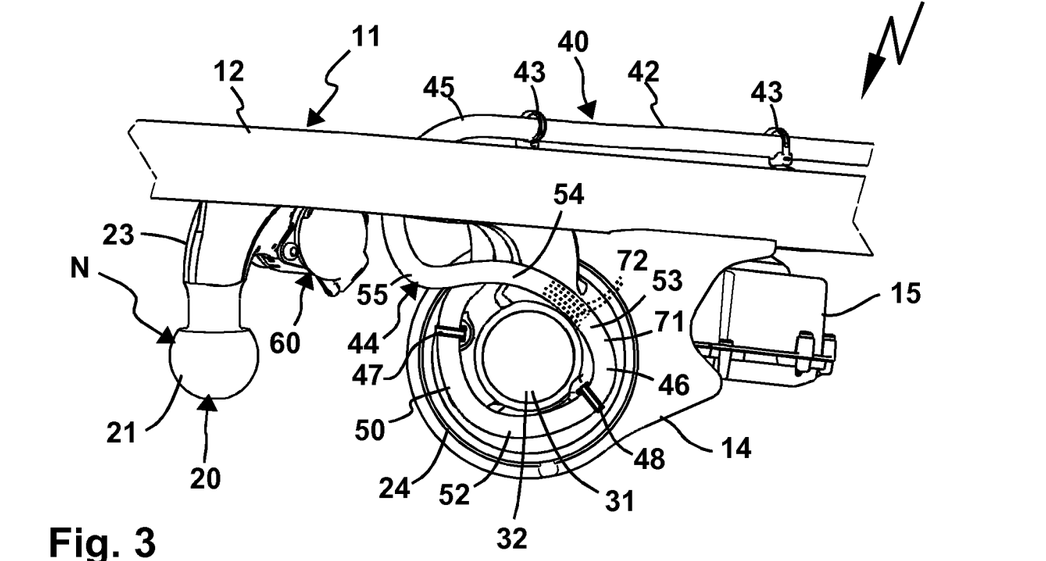
Figure 4:
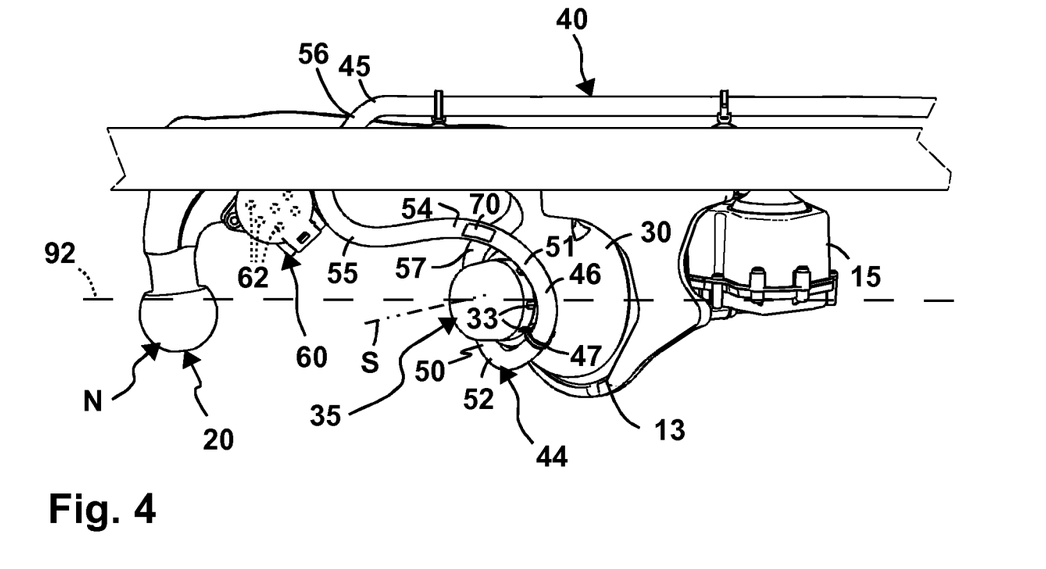
FIG. 4 the trailer coupling according to FIG. 3 in a lateral oblique view, and FIG. 5 a trailer coupling corresponding to the previously described trailer coupling, wherein, however, a winding device comprises a rotatably supported winding body on the vehicle side.

The coupling piece 21 is mounted on a free end 22 of a coupling arm 23. A pivot bearing section 24 of the coupling arm 23 is supported on a bearing 13, in particular a pivot bearing, so that it can pivot between the use position G and a non-use position N according to FIGS. 3, 4. In the non-use position N the coupling piece 21 is preferably moved behind the bumper 92 and/or the cross-member 12, but in any case is not capable of coupling the trailer 95 or the load carrier 195. Generally, in the non-use position N, the coupling element 20 is not or only partially visible to a user, which is aesthetically pleasing. However, these kinematics make routing a cable 40, which extends between the on-board network 93 and a connection device 60 and allows an electrical and/or optical connection between the on-board network 93 of the motor vehicle 90 and an on-board network 99 of the trailer 95 or on-board network 199 of the load carriers 195, harder.

The connection device 60, by way of example what is known as a socket is, in particular, fastened to the coupling arm 23, such that it takes part in the pivoting movement of the latter about a pivot axis S between the use position G and the non-use position N. In the use position G, the connection device 60 is easily accessible, whereas in the non-use position N, together with the coupling element 20, it is completely or substantially hidden behind the bumper 92.

The coupling element 20 has a curvature section 25, extending away from the pivot bearing section 24, a substantially straight section 26 and a further curvature section 27 between the section 26 and the free end 22. On the inside of the curvature section 27 a holder 28, by way of example comprising support blocks, is provided for the connection device 60. On the outside of the curvature section 27 there is advantageously an eyelet 29 for suspending a breakaway cable.

So, consequently, the connection device 60 is, as it were, protectively mounted in the inside curve of the curvature section 27. By way of example a housing 61, which is held in the holder 28 e.g. by means of holding projections 64, is in this way protected. By way of example, in the housing 61 plug contacts 62 of the connection device 60 are present, which are connected with individual conductors not shown in the drawing of the cable 40, by way of example conductors for powering lights on the trailer 96. The plug contacts 62 can be protected by a cover 63 in an in itself known manner. By way of example, the cover 63 is supported on the housing 61 of the connection device 60 so that it can pivot. When the cover 63 is open, a connection device 98, 198 of the trailer 95 or the load carrier 195, by way of example a trailer plug, can be connected with the connection device 60, of the trailer socket described above, so that an on-board network 99 of the trailer 95 connected with the connection device 98 is connected with the on-board network 93 via the connection device 60.

By way of example, the cable 40 leads to a control device or connection device 41 for controlling the on-board network 99, so that, by way of example, rear lights of the trailer 95, indicator lamps, or similar, can be controlled.

By way of example, the bearing 13 is provided on a holder 14 which protrudes from the cross-member 12 in particular protruding downwards. On the holder 14, in a manner that is not shown, a bearing axis is supported so that it can pivot or a bearing axis protrudes towards the pivot bearing section 24 of the coupling element 20. So, the pivot bearing section 24 is supported on the holder 14 so that it can pivot about the pivot axis S. By way of example, the pivot bearing section 24 has a bearing head 30, in which a bearing shaft, protruding from the holder 14, engages. A free front face of the bearing head 30 is covered by a cover body 31. As explained further in the following, the cover body 31 forms a winding body 32 for the cable 40.

The cable 40 has a cable section 42, which is connected to the connection device or control device 41. By way of example, the section 42 extends along the cross-member 12. By way of example, the section 42 is attached with fastening means 43, in particular cable clips, cable ties or similar, to the cross-member 12. The fastening means 43 thus ensure a positionally fixed connection of the cable section 42 to the cross-member 12. The cable section 42 can be a flexible cable or also comprise an inflexible or rigid cable. By way of example, the cable 40 can be routed in the region of the cross-member 12 in a receiving tube or cable channel.

The cable section 42 merges into a cable section 44, which is flexible, so that it takes part in the movements of the coupling element 20 between the non-use position N and the use position G. The cable section 44 has a first longitudinal end 45, which through the fastening means 43 is, as it were, attached in a positionally fixed manner. The other, second longitudinal end 46 of the cable section 44 is positionally fixed through fastening means 47, 48 in relation to the bearing head 30 or the pivot bearing section 24 of the coupling element 20. It should be noted at this point that one of the fastening means 47 or 48 may be sufficient to fasten the second longitudinal end 46 to the coupling element 20.

So, when the coupling element 20 pivots about the pivot axis S, the second longitudinal end 46 follows in any case, wherein the latter together with a winding section 49 forms a coil 50.

The coil 50 extends with a section 52 in a curved manner about the winding body 32, and consequently the cover body 31 and forms a part of at least one winding 51. The winding body 32 forms a component of a winding device 35.

By way of example, the fastening means 47, 48 comprise cable clamps, cable clips or similar, which are mounted on the pivot bearing section 24 or the bearing head 30 at an angular distance from each other. The cable section 52 runs between the fastening means 47, 48 with a curved path, which already substantially configures the curvature or curved path of the coil 50, in particular of a section 53, which forms at the second longitudinal end 46, when the winding section 49 is wound towards the coil 50.

A section 54 of the cable section 44 or of the coil 50, which intersects with a section 57 of the cable section 44, which starting from the fastening means 48 extends in the direction of the curvature section 25 of the coupling element 20, connects to the section 53.

The section 54 forming to at least some extent a further component of the coil 50 can run through a shaped body 70, by way of example a sheath of the cable 40, in which advantageously individual leads for the plug contacts 62 run, can be loaded in a predetermined curvature or extended position. So, for example, it can be provided that upon relieving the strain in the section 54, when the coupling element 20 moves in the direction of the non-use position N, the section 54 configures a curved path according to the curvature or curved path of the coil 50.

By way of example, if the shaped body 70 is pre-formed in the direction of a curved path of the section 54, the shaped body 70 or the coil 50 can also operate as a drive of the coupling element 20 in the direction of the non-use position N or in the opposite direction as a brake when the coupling element 20 is moved in the direction of the use position G.

It would also be perfectly possible for a sheath 71, enclosing individual leads or single conductors 72 of the cable section 44, to have a curved path upon strain relief or a straight path upon strain relief, and in this respect to also operate as a shaped body in the sense of configuring the coil 50 or winding up the coil 50.

Starting from the section 57 a section 58 of the cable 40 runs along the straight section 26 of the coupling element 20, which ultimately is connected via an angled region or connecting section 59 with the connection device 60. The connecting section 59 passes into the housing 61 on the side opposite the cover 63. The section 58 is run closely along the straight section 26, by way of example glued to the section 26, or attached with suitable cable clips, cable ties or similar. On the section 26 a cable channel or a groove can be provided for accommodating the section 58 of the cable 40.

So, the coil 50 comprises a winding 51 the, as it were, inlet side section 54 of which intersects with the, as it were, outlet side section 57 of the cable 40. So, consequently, there is a complete winding 51 present at the coil 50, when the coupling element 20 adopts an end position, here, by way of example the non-use position N.

A curvature section 55 connects to the section 54, which runs in a loop shape or forming a loop 56 as far as the first longitudinal end 45 of the cable section 44. As indicated by the drawing, when the coupling element 20 moves between the use position G and the non-use position N the loop 56 remains substantially unchanged, and so has the same geometrical path or longitudinal path. The freedom of movement necessary to move the coupling element 20 or the connection device 60 between the use position G and the non-use position N is achieved by the winding up of the winding section 49 into the coil 50 and the unwinding of the winding section 49 from the coil 50.

The coil 50 can be substantially freestanding, by way of example with a distance to the winding body 32. But, by way of example, it is also possible for it to come to rest or be supported on the outer circumference of the winding body 32 on support contours 33 or in another way. The cover body 31 or winding body 32 has a substantially cylindrical shape, so that the coil 50 comes to rest on the cylindrical outer circumference of this. There the support contours 33, by way of example support ribs, provide support.

Various methods may be used to operate or move the coupling element 20. By way of example, a manual movement is possible, during which the operator grasps the coupling arm 23, in order to move it between the use position G and the non-use position N. By way of example, this is the case with the trailer coupling 10. It can be seen that in doing so the winding body 32 rotates as well, so that it winds up or unwinds the coil 50. It is also possible for the winding body 32 to merely represent a winding aid, e.g. for the winding section 49 to be prevented by the winding body 32 from adopting a form other than the coil 50.

At this point it is worth mentioning that the coil 50 can obviously also be supported on the bearing head 30, so that this forms a winding body.

The coil 50 runs about the pivot axis S.

For rotary actuation or for rotary driving of the coupling element 20 between the use position G and the non-use position N, however, a drive 15 can also be provided. By way of example, a fluid or electric engine, a spring drive or an electric motor 16 via a gear unit 17 drives the coupling arm 23 to perform the pivoting movement about the pivot axis S, wherein it simultaneously drives the winding device 35, in order to create or unwind the coil 50.

Figure 5:
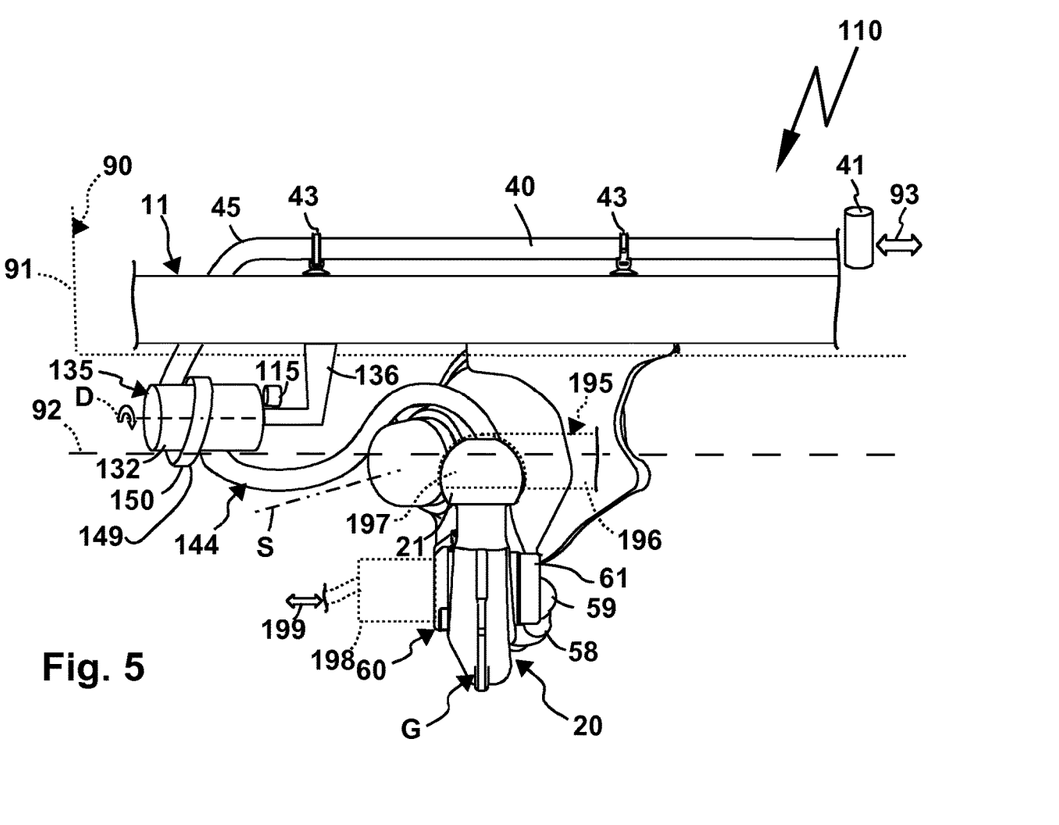

FIG. 5 illustrates a slightly different concept for the trailer coupling 110. By way of example, a winding device 135 is provided there which is positionally fixed in relation to the support arrangement 11. By way of example, a winding body 132 is supported on a support 136 so that it can rotate about a rotational axis D. By way of example, the rotational axis D extends parallel or substantially parallel to the longitudinal axis of the cross-member 12. Consequently, it is possible for the winding section 149 of a cable section 144, which basically corresponds to the cable section 44, to be wound up onto the winding body 132 and unwound, when the coupling arm 23 or the coupling element 20 moves between the use position G and the non-use position N.

By way of example, in the non-use position N, a shorter lead length of the cable section 144 is necessary than in the use position G, so that, by way of example, a coil 150, extending around the outer circumference of the winding body 132, is partially wound in the use position G, and in the non-use position N is to a greater extent wound up onto the winding body 132. By way of example, it is preferable if a drive 115 is provided for the winding body 132, by way of example a spring drive, so that the winding body 132 has a tendency to create the coil 150, and consequently to wind up the winding section 149. This is particularly necessary if the coupling element 20 moves from the use position G to the non-use position N.

Advantageously, the drive 115 can also serve, by way of example, to drive the coupling element 20 in the direction of the non-use position N or when moving in the direction of the use position G to brake it.

The invention claimed is:

1. A trailer coupling having a support arrangement that is adapted to be fastened, to a motor vehicle, on which a bearing is mounted, wherein on the bearing a coupling element is adjustably moveable between a use position which is suitable for coupling a trailer or load carrier to the coupling element, and in which when the trailer coupling is mounted on the motor vehicle the coupling element projects rearwardly of the motor vehicle, and a non-use position, wherein on the coupling element, a connecting device for connecting an on-board network of the trailer or load carrier to an on-board network of the motor vehicle is mounted, wherein the connecting device is connectable, to the on-board network of the motor vehicle by a cable comprising a flexible cable section, which at a first longitudinal end is attached to the coupling element in a positionally fixed manner with respect to a carrier arrangement, and at a second longitudinal end is attached to the coupling element in a positionally fixed manner, and which follows the movement of the coupling element between the use position and the non-use position, wherein the cable comprises a winding device configured to wind up a winding section of the cable section onto a coil when the coupling element is moved between the use position and the non-use position, wherein in the wound state of the cable section at least two subsections of the cable section having a longitudinal distance from one another intersect.

2. The trailer coupling according to claim 1, wherein the winding device is mounted on the coupling element or has a fixed connection or is moveably-coupled to the coupling element, so that during the adjustment movement between the use position and the non-use position, the winding device is driven for winding up or unwinding the coil.

3. The trailer coupling according to claim 1, wherein the winding device comprises a winding body for winding up the cable section, onto which the cable section can at least in part be wound.

4. The trailer coupling according to claim 1, wherein the winding device comprises a winding body for winding up the cable section, which forms a winding aid to support creation the coil.

5. The trailer coupling according to claim 1, wherein the winding section configures the coil at least in sections in a freestanding manner without support on a winding body.

6. The trailer coupling according to claim 3 wherein the winding body comprises or is configured as a drum.

7. The trailer coupling according to claim 3 wherein support contours are mounted at an angular distance from one another and are mounted on the winding body to support the coil.

8. The trailer coupling according to claim 1, wherein the coupling element pivots about at least one pivot axis between the use position and the non-use position.

9. The trailer coupling according to claim 8, wherein the winding device, is supported so that it rotates about the at least one pivot axis of the coupling element for winding up and unwinding the coil.

10. The trailer coupling according to claim 8, wherein the winding device, is arranged on a pivot bearing section able to pivot on the bearing of the coupling element or is formed by the pivot bearing section.

11. The trailer coupling according to claim 1, wherein the second longitudinal end of the cable section is attached to the coupling element with a curve with a direction of curvature that corresponds to the curvature of the coil.

12. The trailer coupling according to claim 1, wherein a fastening of the cable section to the coupling element determines a direction of the coil to be created.

13. The trailer coupling according to claim 1, wherein the second longitudinal end is attached to two points of fixing, which has a longitudinal distance and/or an angular distance from one another, on the coupling element and/or a winding body supporting the coil at least in sections.

14. The trailer coupling according to claim 1, wherein the cable between the second longitudinal end of the windable cable section and the connection device is attached to the coupling element in a positionally fixed manner.

15. The trailer coupling according to claim 1, wherein the cable between the second longitudinal end of the windable cable section and the connection device, is packed on the coupling element.

16. The trailer coupling according to claim 1, wherein the cable between the second longitudinal end of the windable cable section and the connection device, is mounted on or in an accommodating channel of the coupling element.

17. The trailer coupling according to claim 1, wherein the cable section between the coil and the support arrangement or the coupling element in the use position and the non-use position has substantially the same longitudinal length and/or the same geometrical path and/or a loop shape.

18. The trailer coupling according to claim 1, wherein the coil maintains its wound position without the effect of force or with the effect of a force that is lower than one for winding the coil.

19. The trailer coupling according to claim 1, wherein the winding device has at least one shaped body mounted on the cable section and extending along the cable section, which impinges upon the cable section in a wound up state configuring the coil or in an unwound state unwound from the coil and extending the cable section.

20. The trailer coupling according to claim 19, wherein the shaped body comprises an individual conductor of the sheath enclosing the cable section and/or a spring and/or a curvature, running transversally to the elongation of the cable section and changes its radius of curvature upon stretching or winding up of the cable section.

21. The trailer coupling according to claim 1, wherein the winding device is driven in the direction of a winding up and/or unwinding of the cable section by a drive.

22. The trailer coupling according to claim 1, wherein the coil in the wound state comprises at least a three-quarters winding.

23. A trailer coupling having a support arrangement that is adapted to be fastened, to a motor vehicle, on which a bearing is mounted, wherein on the bearing a coupling element is adjustably moveable between a use position which is suitable for coupling a trailer or load carrier to the coupling element, and in which when the trailer coupling is mounted on the motor vehicle the coupling element projects rearwardly of the motor vehicle, and a non-use position, wherein on the coupling element, a connecting device for connecting an on-board network of the trailer or load carrier to an on-board network of the motor vehicle is mounted, wherein the connecting device is connectable, to the on-board network of the motor vehicle by a cable comprising a flexible cable section, which at a first longitudinal end is attached to the coupling element in a positionally fixed manner with respect to a carrier arrangement, and at a second longitudinal end is attached to the coupling element in a positionally fixed manner, and which follows the movement of the coupling element between the use position and the non-use position, wherein the cable comprises a winding device configured to wind up a winding section of the cable section onto a coil when the coupling element is moved between the use position and the non-use position, wherein in the wound up state of the cable section at least two subsections of the cable section having a longitudinal distance from one another are arranged alongside one another.

24. A trailer coupling having a support arrangement that is adapted to be fastened, to a motor vehicle, on which a bearing is mounted, wherein on the bearing a coupling element is adjustably moveable between a use position which is suitable for coupling a trailer or load carrier to the coupling element, and in which when the trailer coupling is mounted on the motor vehicle the coupling element projects rearwardly of the motor vehicle, and a non-use position, wherein on the coupling element, a connecting device for connecting an on-board network of the trailer or load carrier to an on-board network of the motor vehicle is mounted, wherein the connecting device is connectable, to the on-board network of the motor vehicle by a cable comprising a flexible cable section, which at a first longitudinal end is attached to the coupling element in a positionally fixed manner with respect to a carrier arrangement, and at a second longitudinal end is attached to the coupling element in a positionally fixed manner, and which follows the movement of the coupling element between the use position and the non-use position, wherein the cable comprises a winding device configured to wind up a winding section of the cable section onto a coil when the coupling element is moved between the use position and the non-use position, wherein in the wound up state of the cable section at least two subsections of the cable section fit tightly against each other.

25. The trailer coupling according to claim 1, wherein the winding device and/or the coil operates as a brake braking the coupling element or as a drive driving the coupling element during movement of the coupling element between the use position and the non-use position.

26. The trailer coupling according to claim 21, wherein a motorized drive or a spring drive for driving the coupling element drives the winding device in the direction of the winding up and/or unwinding of the cable section between the use position and the non-use position.

27. A trailer coupling having a support arrangement that is adapted to be fastened, to a motor vehicle, on which a bearing is mounted, wherein on the bearing a coupling element is adjustably moveable between a use position which is suitable for coupling a trailer or load carrier to the coupling element, and in which when the trailer coupling is mounted on the motor vehicle the coupling element projects rearwardly of the motor vehicle, and a non-use position in which the coupling element is moved behind a bumper of the motor vehicle, wherein on the coupling element, a connecting device for connecting an on-board network of the trailer or load carrier to an on-board network of the motor vehicle is mounted, wherein the connecting device is connectable, to the on-board network of the motor vehicle by a cable comprising a flexible cable section, which at a first longitudinal end is attached to the coupling element in a positionally fixed manner with respect to a carrier arrangement, and at a second longitudinal end is attached to the coupling element in a positionally fixed manner, and which follows the movement of the coupling element between the use position and the non-use position, wherein the cable comprises a winding device configured to wind up a winding section of the cable section onto a coil when the coupling element is moved between the use position and the non-use position wherein the cable between the second longitudinal end of the windable cable section and the connection device, is mounted on or in an accommodating channel of the coupling element.

28. A trailer coupling having a support arrangement that is adapted to be fastened, to a motor vehicle, on which a bearing is mounted, wherein on the bearing a coupling element is adjustably moveable between a use position which is suitable for coupling a trailer or load carrier to the coupling element, and in which when the trailer coupling is mounted on the motor vehicle the coupling element projects rearwardly of the motor vehicle, and a non-use position in which the coupling element is moved behind a bumper of the motor vehicle, wherein on the coupling element, a connecting device for connecting an on-board network of the trailer or load carrier to an on-board network of the motor vehicle is mounted, wherein the connecting device is connectable, to the on-board network of the motor vehicle by a cable comprising a flexible cable section, which at a first longitudinal end is attached to the coupling element in a positionally fixed manner with respect to a carrier arrangement, and at a second longitudinal end is attached to the coupling element in a positionally fixed manner, and which follows the movement of the coupling element between the use position and the non-use position, wherein the cable comprises a winding device configured to wind up a winding section of the cable section onto a coil when the coupling element is moved between the use position and the non-use position, wherein the winding device is driven in the direction of a winding up and/or unwinding of the cable section by a drive.

29. A trailer coupling having a support arrangement that is adapted to be fastened, to a motor vehicle, on which a bearing is mounted, wherein on the bearing a coupling element is adjustably moveable between a use position which is suitable for coupling a trailer or load carrier to the coupling element, and in which when the trailer coupling is mounted on the motor vehicle the coupling element projects rearwardly of the motor vehicle, and a non-use position, wherein on the coupling element, a connecting device for connecting an on-board network of the trailer or load carrier to an on-board network of the motor vehicle is mounted, wherein the connecting device is connectable, to the on-board network of the motor vehicle by a cable comprising a flexible cable section, which at a first longitudinal end is attached to the coupling element in a positionally fixed manner with respect to a carrier arrangement, and at a second longitudinal end is attached to the coupling element in a positionally fixed manner, and which follows the movement of the coupling element between the use position and the non-use position, wherein the cable comprises a winding device configured to wind up a winding section of the cable section onto a coil when the coupling element is moved between the use position and the non-use position, wherein the coil is configured as a freestanding helix.

* * * * *